United States Patent
Gramby et al.

(10) Patent No.: US 8,167,751 B2
(45) Date of Patent: May 1, 2012

(54) CONVEYOR BELT

(75) Inventors: Göran Gramby, Bjärred (SE); Urban Wilthorn, Landskrona (SE)

(73) Assignee: John Bean Technologies AB, Helsingborg (SE)

( * ) Notice: Subject to any disclaimer, the term of this patent is extended or adjusted under 35 U.S.C. 154(b) by 922 days.

(21) Appl. No.: 12/180,386

(22) Filed: Jul. 25, 2008

(65) Prior Publication Data

US 2009/0029816 A1  Jan. 29, 2009

(30) Foreign Application Priority Data

Jul. 27, 2007 (SE) ........................................ 0701790

(51) Int. Cl.
*F16G 13/02* (2006.01)
*B65G 17/38* (2006.01)

(52) U.S. Cl. .......................... 474/206; 198/848; 198/850

(58) Field of Classification Search .................. 474/206, 474/212, 213, 156; 198/635, 848, 850, 851, 198/853
See application file for complete search history.

(56) References Cited

U.S. PATENT DOCUMENTS

| | | | |
|---|---|---|---|
| 4,078,655 A | 3/1978 | Roinestad | |
| 5,271,491 A | 12/1993 | Irwin | |
| 5,445,570 A * | 8/1995 | White | 474/213 |
| 5,690,571 A * | 11/1997 | Mott | 474/212 |
| 5,934,448 A | 8/1999 | Kucharski | |
| 6,969,332 B2 * | 11/2005 | Sakamoto et al. | 474/212 |
| 7,178,662 B2 * | 2/2007 | Olsson et al. | 198/848 |
| 7,546,725 B2 * | 6/2009 | Shimaya et al. | 474/206 |
| 7,658,277 B2 * | 2/2010 | Meulenkamp | 198/850 |

FOREIGN PATENT DOCUMENTS

| | | |
|---|---|---|
| EP | 1426311 A1 | 6/2004 |
| FR | 2815330 A1 | 4/2002 |
| GB | 2008523 A | 6/1979 |
| NL | 1005979 C2 | 11/1998 |
| WO | 9809893 A1 | 3/1998 |
| WO | 2004005167 A1 | 1/2004 |
| WO | 2006/075912 A1 | 7/2006 |

OTHER PUBLICATIONS

Dutch Search Report dated Feb. 5, 2009, issued in corresponding NL2001852, filed Jul. 24, 2008.

* cited by examiner

*Primary Examiner* — William A Rivera
(74) *Attorney, Agent, or Firm* — Christensen O'Connor Johnson Kindness PLLC

(57) ABSTRACT

A conveyor belt comprising a plurality of successive belt elements (2), each belt element (2) comprising at least one transverse rod (4) and two opposing side members (3) connected to each other by the at least one transverse rod (4), and a link (6) forming a joint intermediate the lateral edges (7a, 7b) of the conveyor belt between the adjoining transverse rods (4) of each pair of adjoining belt elements (2). Each link (6) comprises a plate (11) in which two successive rod receiving holes (12) are formed, wherein the rod receiving holes (12) have an offset (O) towards a first side (13) of said plate (11) and wherein a recess (16) is formed in said first side (13) of the plate (11), between said rod receiving holes (12).

11 Claims, 3 Drawing Sheets

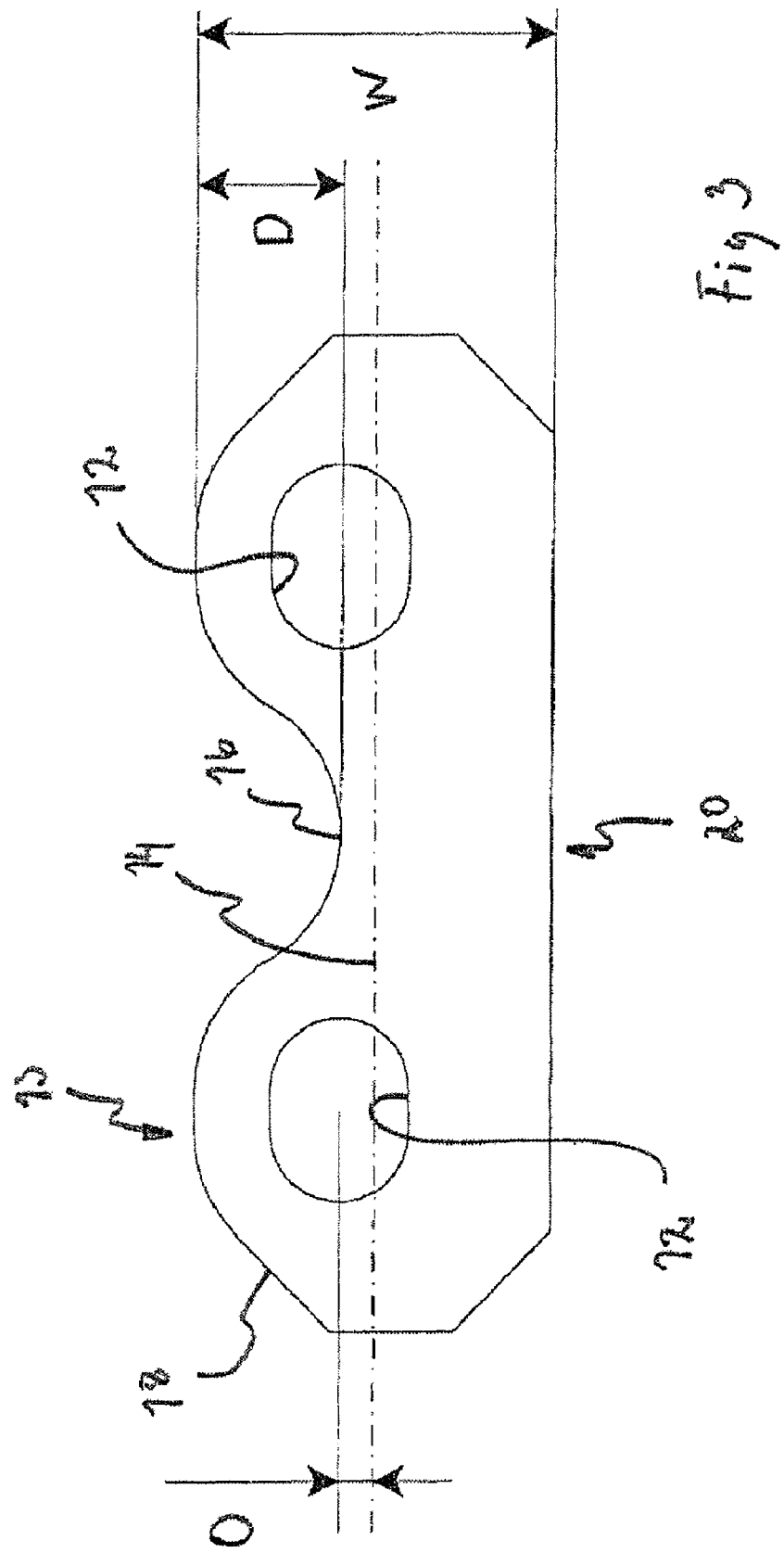

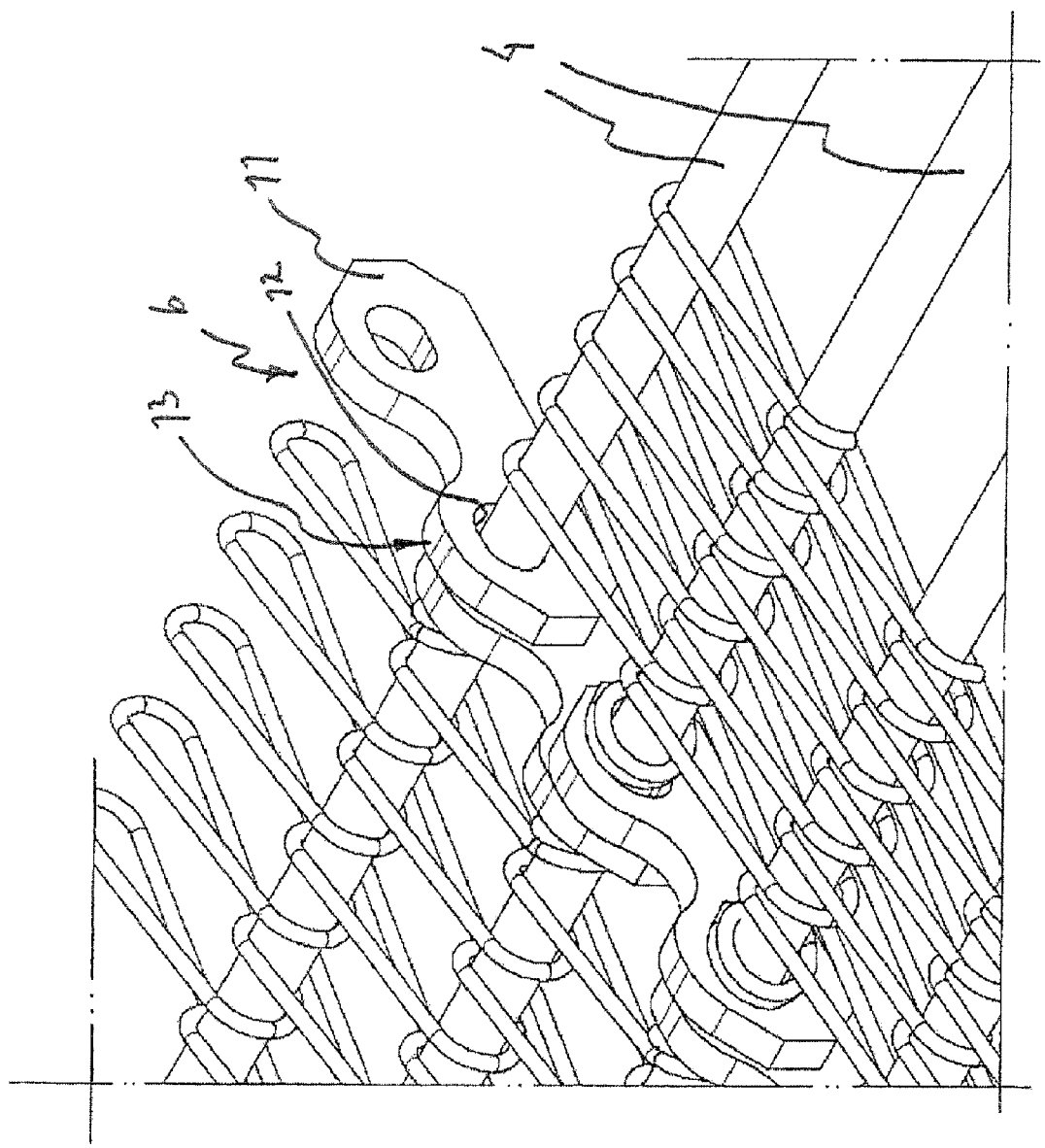

CONVEYOR BELT

FIELD OF THE INVENTION

The present invention relates to a conveyor belt and more specifically to a conveyor belt comprising a plurality of successive belt elements, each belt element comprising at least one transverse rod and two opposing side members connected to each other by the at least one transverse rod, wherein a joint is arranged intermediate the lateral edges of the conveyor belt between the adjoining transverse rods of each pair of adjoining belt elements.

BACKGROUND ART

The above type of conveyor belt is advantageous for inter alia air treatment of food products in cooling, freezing or cooking the food products. The conveyor belt is often made to follow a helical path forming a stack of helically wound tiers.

Each belt element is movable relative to adjoining belt elements about two axes perpendicular to the longitudinal direction of the belt and situated one in the plane of the belt and the other perpendicular thereto.

In order to make as full use as possible of the volume taken up by the stack, the inner radius of the helical path in the stack should be small. However, this requires a substantial collapsing of the corresponding inner side of the belt when transferring from a straight path to a helical path, thereby reducing the area of the belt in its straight stat that can be used in the curved state of the conveyor belt, unless the outer side is expanded at the same time as the inner side is collapsed.

U.S. Pat. No. 4,075,655 discloses a conveyor belt having a plurality of rods extending across the belt and pivotally connected by links at the inner and outer edges of the belt. The belt also has a row of central tractive links controlling the simultaneous collapsing of the inner side of the belt and expanding the outer side of the belt. However, these central links must be rigidly secured to the transverse rods, e.g. by welding, so as to not shift their position laterally. Also, the links project above the load-carrying surface of the belt such that it is not as smooth as desired.

WO 98/09893 discloses a conveyor belt having a plurality of rods and a plurality of side members at both lateral edges of the belt connected in pairs by the rods. A wire netting is supported by the rods and comprises a plurality of wires. A separate one of said wires forms a joint intermediate the lateral edges of the belt between each pair of adjoining rods, each transverse rod in said pair connecting a separate pair of side members such that the joint takes up tractive forces at least along straight parts of the conveyor belt path. The joints need not be rigidly secured to the rods and do not project from the load-carrying surface of the belt. However, in certain cases the joint may break due to high level stress exposure resulting in a conveyor belt breakdown.

Consequently, there is a need of a conveyor belt which also in case of high level stress exposure has a high reliability in operation.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In the light of that stated above, it is an object of the present invention to provide an improved conveyor belt of the type described by way of introduction.

It is also an object of the invention to provide such a conveyor belt which also in case of high level stress exposure has a high reliability in operation.

To achieve these objects, and also other objects that will be evident from the following description, a conveyor belt is suggested according to the present invention having the features as defined in Claim 1. Embodiments of the conveyor belt are stated in the dependent Claims 2-10.

More specifically, according to the present invention a conveyor belt is provided, comprising a plurality of successive belt elements, each belt element comprising at least one transverse rod and two opposing side members connected to each other by the at least one transverse rod, and a link forming a joint intermediate the lateral edges of the conveyor belt between the adjoining transverse rods of each pair of adjoining belt elements. Each link comprises a plate in which two successive rod receiving holes are formed, wherein the rod receiving holes have an offset towards a first side of said plate and wherein a recess is formed in said first side of the plate, between said rod receiving holes.

Hereby an improved conveyor belt is achieved. Since the rod receiving holes of each plate have an offset in the direction towards the first side of the plate, it will be possible to ensure that the links do not project from the load-carrying surface of the conveyor belt by arranging the links such that the first side of each plate faces said load-carrying surface. The offset will result in the formation of a thin portion with a thickness of material between the holes and the first side of the plate. However, the provision of the recess in said first side of the plate results in a direction of a major part of tractive forces applied to the plate towards a thick portion with a thickness of material formed between the holes and a second side of the plate, thereby making it possible to make the link sufficiently strong. Consequently, the unique configuration of the link makes it possible to obtain a conveyor belt with a smooth load-carrying surface, which conveyor belt at the same time exhibit a high reliability in operation even in case of high level stress exposure.

According to an embodiment of the invention conveyor belt, the transverse rods may support a wire mesh for forming a load-carrying surface of the conveyor belt, said wire mesh being formed by a plurality of wires. In this case, the rod receiving holes of each plate may have such an offset towards said first side of the plate that a thickness of material between each hole and said first side essentially corresponds to a wire diameter of said wires. Hereby it will be possible to obtain a smooth load-carrying surface of the belt.

According to another embodiment, the recess of each plate may have a rounded curvature. The rounded curvature of the recess makes it possible to level out stresses applied to each link when subjected to tractive forces and especially stresses applied to the thin portion formed between the rod receiving holes and the first side of the plate. The curvature may be such that a section, including said thin portion, with an uniform thickness of material is formed.

The recess may have a depth essentially equal to the difference between half the width of the plate and said offset.

According to yet another embodiment, the rod receiving holes of each plate may be elongate holes having an extension parallel with a longitudinal axis of the plate. This will result in a further levelling out of stresses applied to the link.

The corners of each plate may be bevelled.

In accordance with a further embodiment, each belt element comprises two transverse rods. Since each belt element may comprise two side members and two transverse rods fixedly connected thereto, the belt element can be given a relatively rigid frame structure, thereby giving the conveyor belt a good load-bearing capacity. In this case, a link in the form of a plate may also be provided between the two transverse rods of each belt element.

Preferred embodiments of the present invention will now be described by way of example and with reference to the accompanying drawings.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a plan view of the link shown in FIG. 2.

FIG. 4 is a perspective view of an enlarged part of the section shown in FIG. 1.

DESCRIPTION OF EMBODIMENTS

Figure 1:
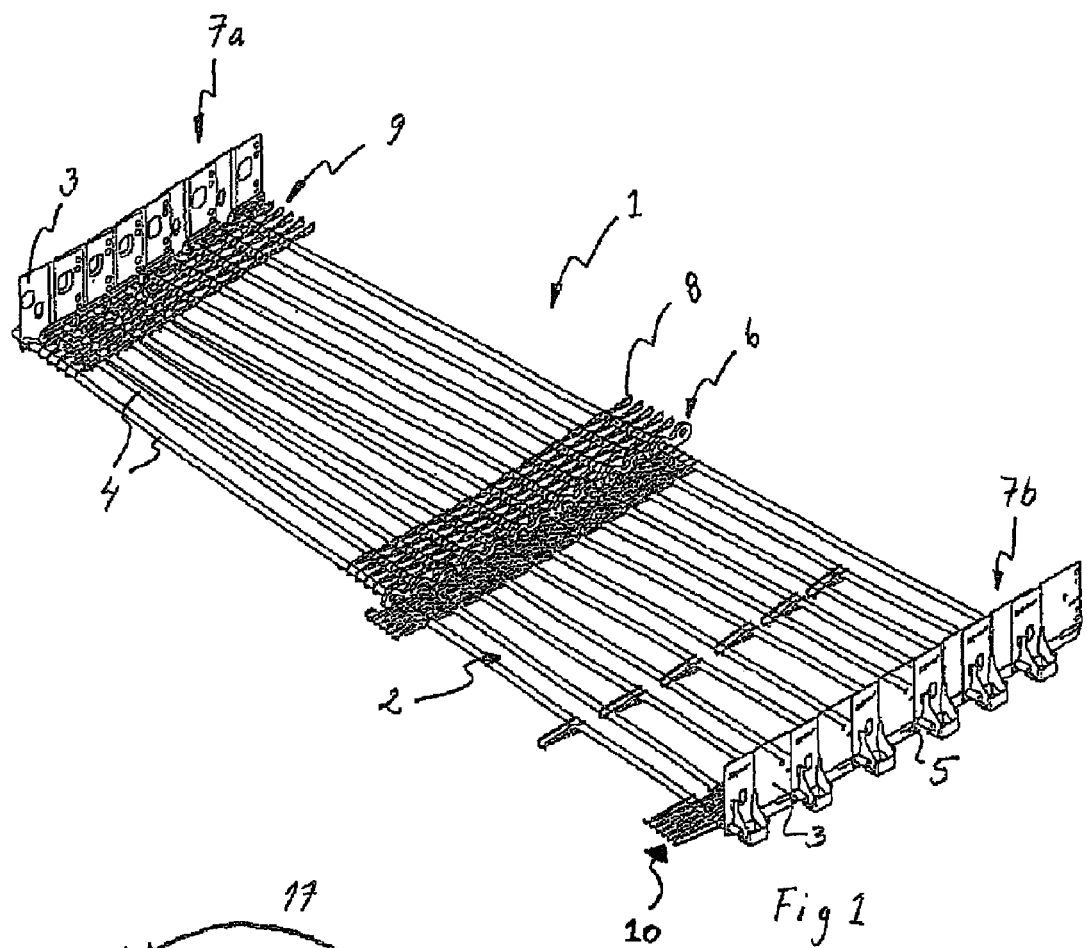
FIG. 1 is a perspective view of a section of a conveyor belt in accordance with the present invention.

In FIG. 1, to which reference now is made, illustrates a section of a conveyor belt 1 in accordance with the invention.

The conveyor belt 1 may be used for an air conditioning plant, in which the conveyor belt 1 is endless and extends helically along part of its length. The conveyor belt 1 can be intended for conveying of foodstuffs, which will be chilled, frozen or cooked when conveyed through the air conditioning plant.

However, it will be appreciated that the inventive conveyor belt 1 can also be used for other applications than air conditioning plants.

The conveyor belt 1 comprises a plurality of successive belt elements 2, which each have two lateral side members 3 and two rods 4 extended between and fixedly connected to the side members 3. This structure results in a relatively rigid frame structure, giving the conveyor belt a good load-bearing capacity.

The conveyor belt 1 may be supported or of a wholly, or partly, self-supporting type.

By a self-supporting type is meant that at least one lateral edge 7a, 7b of a superposed turn of the conveyor belt 1 is stacked, along the distance it travels helically, on an corresponding lateral edge 7a of a subjacent turn of the conveyor belt 1.

Adjoining belt elements 2 are articulated to each other in such a way that each belt element 2 is movable relative to adjoining belt elements 2 about two axis perpendicular to the longitudinal direction of the belt 1 and situated one in the plane of the belt 1 and the other perpendicular thereto.

An elongate hole 5 is formed in each side member 3. The elongate holes 5 of the side members 3 of a first belt element 2 receives an adjoining rod 4 of a second, adjoining belt element 2. Hereby, movement about said two axis is permitted.

The belt elements 2 are further connected by means of links 6 which form a joint intermediate the lateral edges 7a, 7b of the conveyor belt 1 between the adjoining transverse rods 4 of each pair of adjoining belt elements 2. In operation of the conveyor belt 1, the links 6, which will be described in detail below, take up tractive forces at least along straight parts of the conveyor belt path.

In the embodiment shown, links 6 are also provided intermediate the lateral edges 7a, 7b of the conveyor belt 1 between the two rods 4 of each belt element 2.

In the shown embodiment, the rods 4 of the belt elements 2 further support a wire mesh 8 forming a load-carrying surface of the conveyor belt 1. The wire mesh 8 is formed by a plurality of wires having a wire diameter.

The wire mesh 8 may be formed so that it acts to position the links 6 intermediate the lateral edges 7a, 7b of the conveyor belt 1.

The lateral edges 7a, 7b of the conveyor belt 1 may be brought together, or collapsed. The lateral edges 7a, 7b of the conveyor belt 1 may also be extended, or expanded. Thus, when the conveyor belt 1 is transferred from a straight path to a helical path, its inner side, corresponding to the lateral edge 7a in FIG. 1, may be collapsed at the same time as the outer side, corresponding to the lateral edge 7b in FIG. 1, is expanded. The tractive links 6 positioned intermediate the lateral edges 7a, 7b of the conveyor belt 1 control the simultaneous collapsing of the inner side and expanding of the outer side.

The wire mesh 8, which is only partly shown in FIG. 1, comprises a first side portion 9 and a second side portion 10 separated from each other by the links 6. The first side portion 9 is adjacent to the lateral edge 7a of the conveyor belt 1 forming the inner side when the belt 1 follows the helical part of the conveyor belt path. The second side portion 10 is consequently adjacent the lateral edge 7b forming the outer side. The first side portion 9 of the wire mesh 8 may as shown in the disclosed embodiment have a pitch which is greater than the pitch of the second side portion 10. The inner side will be collapsed and the outer side will be expanded when the conveyor belt 1 follows its helical part of the conveyor belt path, and thus the difference in pitch will act to provide a more uniform compactness of the wire mesh 8.

Figure 2:
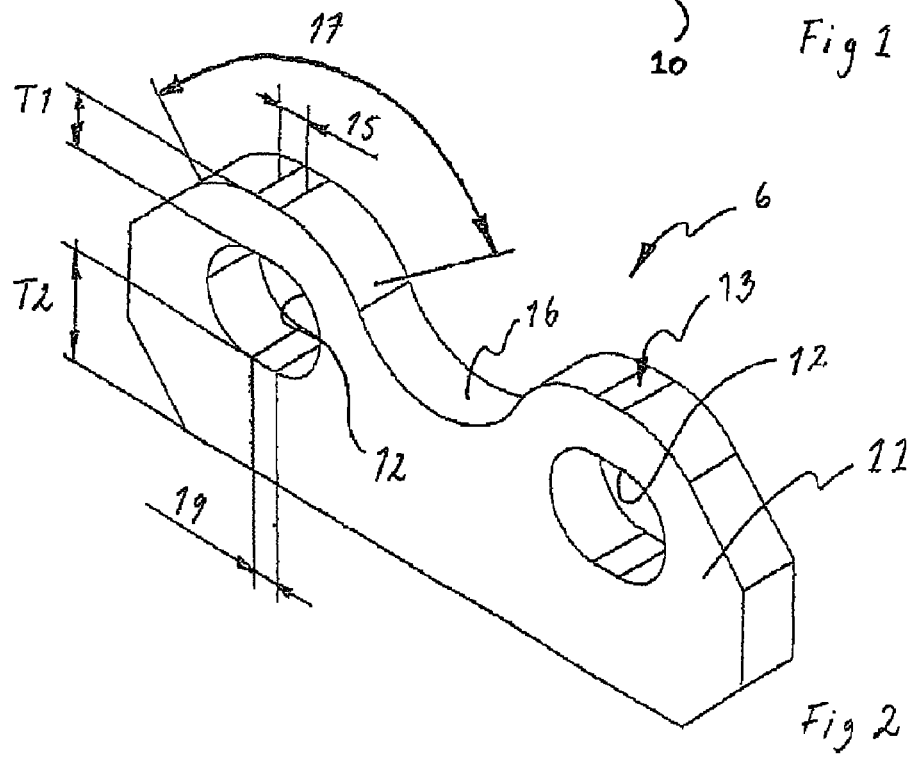
FIG. 2 is a perspective view of a link forming a joint between adjoining transverse rods of the conveyor belt in FIG. 1.

FIG. 2, to which reference now is made, illustrates a link 6 used in the conveyor belt 1 shown in FIG. 1.

The link 6 is in the form of a plate 11 in which two successive rod receiving holes 12 are formed, wherein the rod receiving holes 12 have an offset O towards a first side 13 of the plate 11. More specifically, the plate 11 is extended along a longitudinal axis and the two successive rod receiving holes 12 have an offset O from said longitudinal axis towards said first side 13 of the plate 11. The offset O is illustrated in FIG. 3, to which reference now also is made, as the distance in a direction perpendicular to the longitudinal axis 14, between said axis 14 and the centre point of one of the rod receiving holes.

The rod receiving holes 12 of the plate 11 may have such an offset O towards said first side 13 of the plate 11 that a thin portion 15 between each hole 12 and said first side 13 is formed having a thickness T1 of material essentially corresponding to said wire diameter of the wires making up said wire mesh 8. The thin portion 15 may thus have a thickness of material that is slightly greater than said wire diameter.

A recess 16 is formed in said first side 13 of the plate 11, between said rod receiving holes 12. In the shown embodiment, the recess 16 has a rounded curvature. The curvature of the recess 16 may be such, as shown in FIG. 2, that a section 17, including said thin portion 15, with uniform thickness of material is formed between each rod receiving hole 12 and the first side 13 of the plate 11, said uniform thickness of material consequently corresponding to the thickness T1 of material of said thin portion 15.

The recess may as in the shown embodiment have a depth D essentially corresponding to the difference between half the width W of the plate and the offset O.

The corners of the plate 11 may be bevelled, as in the shown embodiment. The section 17 with uniform thickness of material may be extended by the bevels 18 on the first side of the plate 13.

The rod receiving holes 12 of the plate 11 may as shown be elongate holes having an extension in a direction parallel with the longitudinal axis 14 of the plate 11.

In FIG. 4, to which reference now is made, an enlarged part of the conveyor belt section of FIG. 1 is shown. More specifically, the arrangement of the links 6 in the form of plates 11 is shown.

Each pair of adjoining rods 4 of the conveyor belt 1 is interconnected by means of one such plate 11. The rod receiving holes 12 of the plate 11 receive a rod 4 each of said pair of rods 4.

The plates 11 are orientated such that the first side 13 of each plate 11 faces the load-carrying surface of the conveyor belt 1 formed by the wire mesh 8.

By ensuring that the thin portion 15 has thickness T1 of material which essentially corresponds to the wire diameter of the wires making up said wire mesh 8, it will be possible to obtain a smooth load-carrying surface of the conveyor belt 1.

As stated above, the links 6 in the form of plates 11 will, in operation of the conveyor belt 1, take up tractive forces at least along straight parts of the conveyor belt path. Consequently, the plates 11 will be subjected to stress, the amounts of which will increase with increased loads.

The offset O of the rod receiving holes 12 of each plate 11 results in the formation of a thin portion 15 with a thickness T1 of material between the rod receiving holes 12 and the first side 13 of the plate 11 and simultaneous the formation of a thick portion 19, which is shown in FIG. 2 and which has a thickness T2 of material between said holes 12 and a second side 20 of the plate 11, said second side 20 being opposite said first 13 side of the plate 11. The thin portion 15 with the thickness T1 of material will constitute the weak part of the plate 11.

The recess 16 formed in the first side 13 of the plate 11 will, when the plate 11 act to take up tractive forces, direct a major part of said tractive forces to the thick portion 19 of the plate 11. Consequently, the recess 16 will ensure that the thin portion 15, i.e., the weak part of the plate 11, will be subjected to a reduced amount of stress, which obviously have a positive effect on the service life of the plates and thus the conveyor belt 1 will obtain an improved reliability in operation.

The recess 16 having a depth D essential equal to the difference between half the width W of the plate 11 and the offset O ensures that the major part of the tractive forces applied to the plate will be directed to said thick portion 19.

The thick portion 19 of the plate may be designed with a thickness T2 of material sufficient for taking up the required tractive forces as no restrictions are imposed on this thick portion 19 with regard to obtaining a smooth load-carrying surface.

The sections 17 with uniform thickness of material formed by the offset O, the curvature of the recess 16 and the bevels 18 help in levelling out the stress applied to the plates 11 when taking up tractive forces.

The shape of the rod receiving holes 12 in the form of elongate holes also helps to level out the stress applied to the plates 11, thereby further prolonging the service life of the plates 11.

In accordance with the present invention it is thus provided a conveyor belt comprising successive belt elements, each comprising at least one transverse rod and two side members connected to each other by means of said at least one transverse rod. The adjoining rods of each pair of adjoining belt elements are connected by means of a link arranged intermediate the lateral edges of the conveyor belt. Adjoining belt elements are connected to each other in such a way that each belt element is movable relative to adjoining belt elements about two axis perpendicular to the longitudinal direction of the belt and situated one in the plane of the belt and the other perpendicular thereto. As a result, the inner side of the belt may be collapsed and the outer side of the belt may be expanded. The links control the simultaneous collapse of the inner side and expansion of the outer side. Due to the fact that the rod receiving holes of each plate have an offset in direction towards a first side of the plate, it will be possible to ensure that the plates do not affect the smoothness of the load-carrying surface of the conveyor belt. As a consequence, food products placed on the load-carrying surface will not be deformed by objects projecting from said surface. Due to the provision of a recess in the first side of each plate, a major part of tractive forces applied to the plates will be directed to a thick portion of the plate with thickness of material. The result is a conveyor belt, which has a high reliability in operation also in case of high level stress exposure.

It will be appreciated that the present invention is not limited to the embodiment illustrated and described above.

For instance, the conveyor belt shown in FIG. 1 may only include links interconnecting adjoining rods of adjoining belt elements. This would mean that no link would interconnect the two rods comprised in a single belt element.

Further, each belt element may include only one rod or more that two rods.

Several modifications and variations are thus feasible, and therefore the scope of the present invention is exclusively defined by the appended claims.

The invention claimed is:

1. A conveyor belt having a load carrying surface, comprising
    a plurality of successive belt elements,
    each belt element comprising at least one transverse rod and two opposing side members connected to each other by the at least one transverse rod, and
    a link forming a joint intermediate the lateral edges of the conveyor belt between the adjoining transverse rods of each pair of adjoining belt elements,
    each link comprising a plate in which two successive rod receiving holes are formed, wherein the rod receiving holes have an offset towards a first side of said plate and wherein a recess is formed in said first side of the plate, between said rod receiving holes, and wherein
    each link being arranged such that said first side of the plate is facing a load-carrying surface of the conveyor belt.

2. Conveyor belt as claimed in claim 1, in which the transverse rods support a wire mesh for forming a load-carrying surface of the conveyor belt, said wire mesh being formed by a plurality of wires.

3. Conveyor belt as claimed in claim 2, in which the rod receiving holes of each plate have such an offset towards said first side of the plate that a thin portion is formed with a thickness of material between each hole and said first side that essentially corresponds to a wire diameter of said wires.

4. Conveyor belt as claimed in claim 1, in which the transverse rods support a wire mesh for forming a load-carrying surface of the conveyor belt, said wire mesh being formed by a plurality of wires.

5. Conveyor belt as claimed in claim 4, in which the rod receiving holes of each plate have such an offset towards said first side of the plate that a thin portion is formed with a thickness of material between each hole and said first side that essentially corresponds to a wire diameter of said wires.

6. Conveyor belt as claimed in claim 1, in which the recess of each plate has a rounded curvature.

7. Conveyor belt as claimed in claim 1, in which the recess has depth essentially equal to the difference between half the width of the plate and said offset.

8. Conveyor belt as claimed in claim 1, in which the rod receiving holes of each plate are elongate holes having an extension parallel with a longitudinal axis of the plate.

9. Conveyor belt as claimed in claim 1, in which the corners of each plate are bevelled.

10. Conveyor belt as claimed in claim 1, in which each belt element comprises two transverse rods.

11. Conveyor belt as claimed in claim 10, in which a link in the form of a plate also is provided between the two transverse rods of each belt element.

* * * * *